July 28, 1964     JUNICHI HIYOSHI ET AL     3,142,160
CONTROL DEVICE FOR CAR COOLERS
Filed April 11, 1962
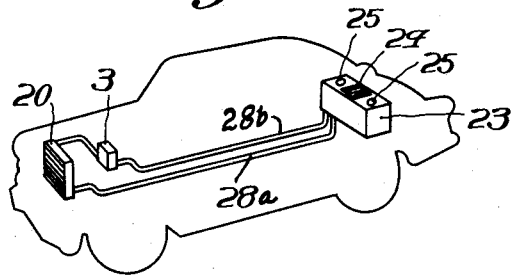
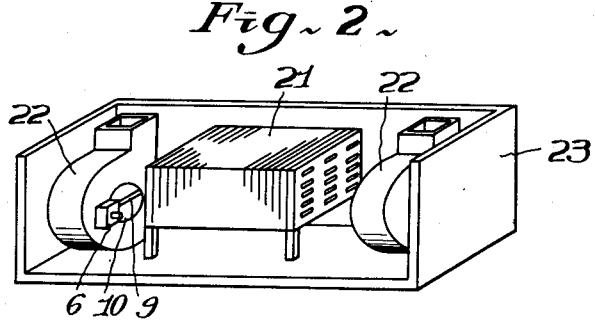
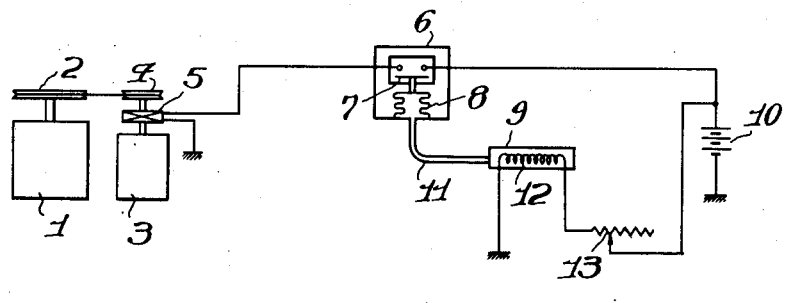
INVENTORS:
JUNICHI HIYOSHI
MASASHI SANO
BY:
M. Glew and Toren
ATTORNEYS

3,142,160
CONTROL DEVICE FOR CAR COOLERS
Junichi Hiyoshi, Meguro-ku, Tokyo-to, and Masashi Sano, Kawasaki-shi, Japan, assignors to Tokyo Shibaura Denki Kabushiki Kaisha, Kawasaki-shi, Japan, a joint-stock company of Japan
Filed Apr. 11, 1962, Ser. No. 186,769
1 Claim. (Cl. 62—202)

This invention relates to a control device for car coolers, more particularly to a temperature control device for car coolers of the type wherein the evaporator and a circulating fan are installed in the rear portion or trunk of a car.

Car coolers having engine driven compressors may be classified into two types, viz., the "dash type" wherein the evaporator and the air circulating fan are installed in or beneath the dash board together with their control device and the "trunk type" wherein the evaporator and air circulating fan are installed in the rear trunk of the car. In both types the temperature of the air within a car can be controlled by changing the setting of a temperature responsive device, the temperature responsive element thereof being generally associated with the evaporator. In the dash type, as the distance between the dash board on which the control knob of the temperature responsive device or switch is mounted and the evaporator, with which the temperature responsive element is associated, is relatively short, it is easy to connect the temperature responsive switch with its temperature responsive element, such as a bulb containing expansible fluid, by means of a relatively short capillary tube as in the case of household refrigerators. In the trunk type, however, it has been impossible to remotely control the evaporator because use of a very long capillary tube between the temperature responsive switch mounted on the dash board and the temperature responsive element associated with the evaporator has resulted in inaccurate operation of the switch.

Accordingly, it is an object of this invention to provide an improved temperature control device for trunk type car coolers.

If the temperature responsive element were installed in the car at the outlet or inlet of the air conducted to the evaporator, the operation of the temperature responsive switch would be affected by direct sunlight, and if said element were installed beneath the evaporator its operation would also be affected by condensation falling from the evaporator.

Accordingly, an important object of this invention to provide an improved temperature control device for car coolers, wherein the temperature responsive element can operate with improved sensitivity.

With the above and other objects in view, this invention provides a control device for a car cooler comprising a thermal switch including an element responsive to the temperature inside a car for controlling the operation of said car cooler, an electric heater for providing additional heat to the temperature responsive element of said thermal switch and means for adjusting the quantity of said additional heat for adjusting the operating point of said thermal switch, said temperature responsive element being situated at the air intake of the cooler.

In accordance with another feature of this invention, the evaporator and the air circulating fan of the car cooler are mounted in the rear trunk of a car and said temperature responsive element is disposed at the air intake port of said fan.

This invention can be better understood from the following description taken in connection with the accompanying drawing, in which—

FIG. 1 is a schematic diagram in perspective view of a car equipped with a conventional car cooler;

FIG. 2 shows a perspective view of an evaporator and air circulating fans; and

FIG. 3 is a schematic diagram showing the arrangement of a control device embodying this invention.

Referring now to the accompanying drawing, FIG. 1 shows a general arrangement of a conventional trunk type car cooler wherein a suitable refrigerant compressed by an engine driven compressor 3 is condensed by a condenser 20 mounted at the front of the car body. Conduits 28a and 28b carry refrigerant to and from an evaporator 21 (FIG. 2) contained in a housing 23 disposed in the rear trunk of the car. As shown in FIG. 2, a pair of air circulating fans 22, each driven by a suitable electric motor, not shown, are disposed on opposite sides of the evaporator 21 to draw air in the car through an intake port 24, through the evaporator and discharge cooled air into the car interior through a pair of outlet ports 25.

Referring now to FIG. 3, the compressor 3 is arranged to be driven by the internal combustion engine 1 for driving the car through pulleys 2 and 4, a belt between these pulleys and an electromagnetic clutch 5, which is adapted to transmit the motive power from said engine to said compressor when energized. The movable contact 7 of a thermal switch 6 is connected in circuit with the electromagnetic clutch to energize it from a suitable source of electric supply indicated as a battery 10. The thermal switch may be of any suitable type known in the art but illustrated here as comprising a temperature responsive element in the form of a bulb 9 containing a suitable expansible fluid such as silicone oil and a bellows 8 connected to the bulb via a tube 11 for actuating said movable contact 6. According to this invention a suitable electric heater 12 is provided for the bulb 9 to provide additional heat thereto, and a variable resistor 13 is included in circuit with the heater 12 to vary the amount of additional heat supplied by the heater 12. Thus, the thermal switch 6 responds to the sum of the temperature of the air in the car and the temperature due to the said additional heat, whereby the setting of the thermal switch or the temperature of the air inside the car can be adjusted to any desired value by varying said variable resistor 13.

According to another feature of this invention, as shown in FIG. 2, the temperature responsive element or bulb 9 of the thermal switch 6 is mounted at the air intake port of the air circulating fan 22 mounted in the rear trunk of the car. By so mounting, the temperature responsive element can operate with improved sensibility because all of the air circulated through the car by the fan flows through said intake port of relatively small cross-sectional area. In other words, as the speed of the air is highest at said intake port, the temperature responsive element can sensibly respond to changes in air temperature. For the sake of clearness of the drawing, electric heater 12 is omitted from FIG. 2. It will be also understood that while the thermal switch 6 together with its temperature responsive element 9 is mounted in the rear trunk, the variable resistance 13 for varying its setting is mounted on the dashboard for easy manipulation.

The operation of this invention is as follows:

During operation of the car cooler, when the temperature of the air inside the car has been decreased below a predetermined value by the operation of the compressor 3, the movable contact 7 opens to stop the compressor 3 by deenergizing the exciting coil of the electromagnetic clutch 5. After a certain time when the temperature in the car has gradually increased and finally reaches said predetermined value, the fluid in the temperature responsive element 9 sufficiently expands to reclose the movable contact to restart the compressor. Assuming now that it is desired to maintain the temperature in the car at a higher value than that initially set. Then the variable resistance 13 is increased to decrease the amount of heat generated by the electric heater 12 thus causing the thermal switch 6 to operate at a higher temperature than that initially set. Conversely, in order to maintain the temperature in the car at a lower temperature than that initially set, the value of resistance of said variable resistor 13 is decreased to increase the heat generated by the heater 12.

While in the above embodiments the thermal switch has been shown as being of an expansible bellows type, it is clear that any suitable temperature responsive switch, such as a bimetallic switch, may be substituted for the expansible bellows. It will also be clear that instead of using a variable resistor any suitable means for varying the energization of the electric heater, such as a tapped transformer, may be utilized.

Thus, this invention provides an improved temperature control device for a car cooler by which the temperature of a car can be easily controlled from a remote position. Accordingly this invention is most suitable for use in a car cooler of the type wherein the evaporator and air circulating fan are mounted in the rear trunk of the car.

While the invention has been described by illustrating particular embodiments thereof it will be understood to these skilled in the art that many modifications may be made therein without departing from the true spirit of this invention as defined in the appended claim.

What is claimed is:

In an automobile including a battery, an engine compartment with a refrigerant compressor adapted to be driven by the engine and coupled therewith by an electromagnetic clutch, a passenger compartment having a dashboard and a trunk having a evaporator and a fan for recirculating air between the passenger compartment and the evaporator, said fan having an inlet adjacent said evaporator and a discharge directed into said passenger compartment, the improvement comprising a switch connected between said clutch and said battery for connecting and disconnecting said clutch with the battery, said switch including spaced contact terminals, an expansible bellows having contact means movable upon expansion of said bellows to connect said spaced contact terminals and upon contracting said bellows to disconnect said contact terminals, said switch being located adjacent the inlet of said fan and including an enclosure connected to said bellows which together with said bellows is filled with a thermally expansible substance, said enclosure being disposed in the inlet of said fan for exposure to the air being circulated for influencing the expansible substance for expanding and contracting said bellows in accordance with the temperature of said substance as affected by the circulating air, electrical resistance wire heating means connected to said battery and located in heat exchange relationship with the expansible substance in said enclosure for applying heat thereto, and control means connected to said electrical resistance wire means located on the dashboard for varying said electrical resistance wire heating means and the amount of the heat applied thereby to the expansible substance in said enclosure for influencing the actuation of said switch in accordance with expansion and contraction of said bellows by said expansible substance.

References Cited in the file of this patent

UNITED STATES PATENTS 2,746,261   Gibson _____ May 22. 1956